J. SUTTER.
SOLDERING APPARATUS.
APPLICATION FILED OCT. 28, 1916.
1,253,906.
Patented Jan. 15, 1918.
2 SHEETS—SHEET 1.
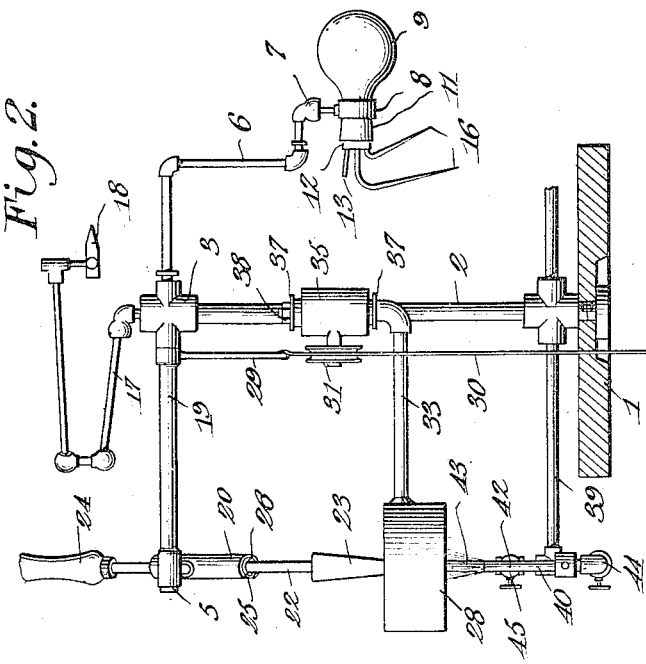
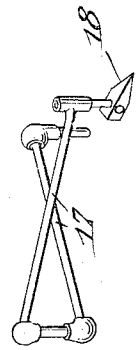
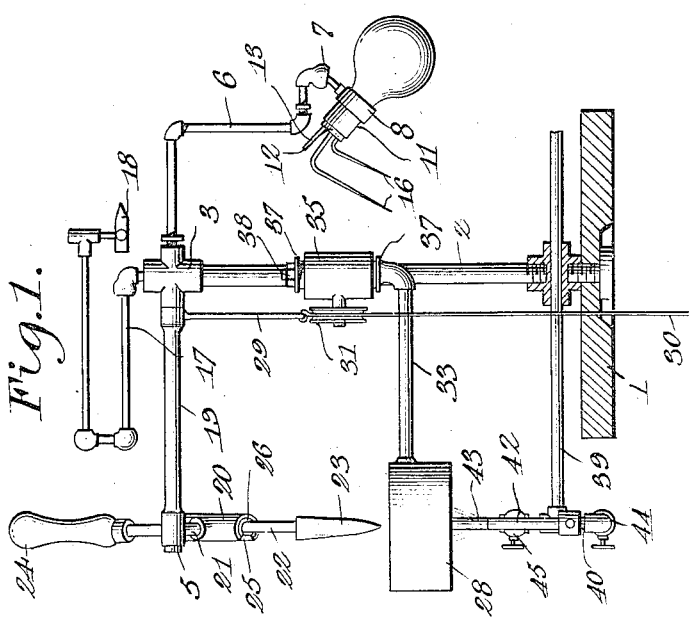
Inventor
Jacob Sutter.
Witnesses
Frederick W. Ely.
E. A. Hines.
By Victor J. Evans
Attorney J. SUTTER.
SOLDERING APPARATUS.
APPLICATION FILED OCT. 28, 1916.
1,253,906.
Patented Jan. 15, 1918.
2 SHEETS—SHEET 2.
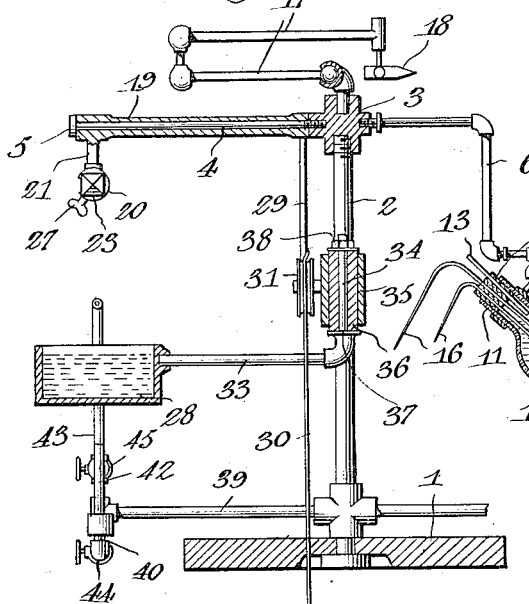
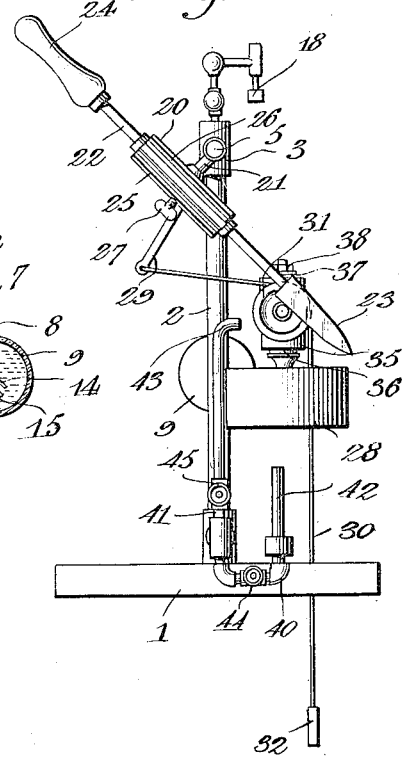
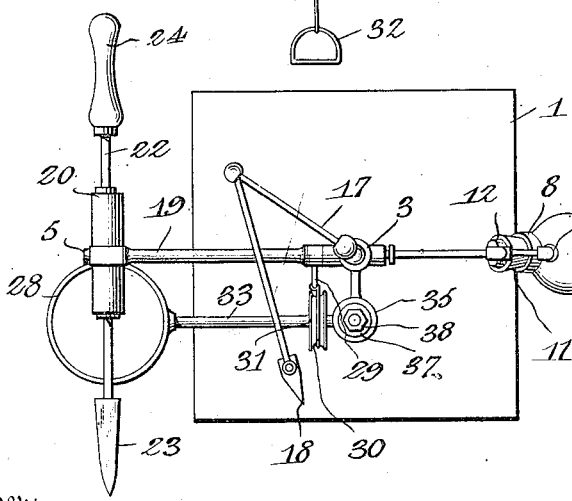
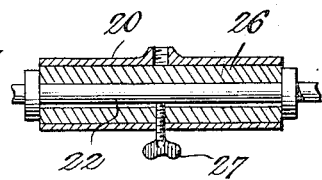
Witnesses
Frederick W. Ely
C. C. Hines
Inventor
Jacob Sutter
By Victor J. Evans
Attorney

UNITED STATES PATENT OFFICE.

JACOB SUTTER, OF NEW YORK, N. Y.

SOLDERING APPARATUS.

1,253,906.                    Specification of Letters Patent.     Patented Jan. 15, 1918.

Application filed October 28, 1916. Serial No. 128,261.

*To all whom it may concern:*

Be it known that I, JACOB SUTTER, a subject of the Czar of Russia, residing at New York, in the county of New York and State of New York, have invented new and useful Improvements in Soldering Apparatus, of which the following is a specification.

This invention relates to a soldering apparatus, particularly designed for soldering small articles, and in cases where a large number of articles are being continuously soldered.

One object of the invention is to provide a machine of this character by means of which the acid or fluxing medium and the solder may be applied to the article in an easy, convenient and rapid manner, and at a material saving of time over the ordinary soldering processes.

A further object of the invention is to provide an apparatus that allows the hands of the operator to remain free to handle the work, and which will permit the operator to operate the soldering tool by foot controlled means.

A still further object of the invention is to provide a soldering apparatus by means of which an article may be soldered and the solder thereon instantly cooled and hardened, to avoid delays occurring in the soldering of some articles where it is necessary to wait to allow the solder to harden until further work thereon can be carried out.

A still further object of the invention is to provide a soldering apparatus which is simple of construction, reliable and efficient in action, and which may be manufactured, installed and operated at a comparatively low cost.

The invention consists of the features of construction, combination and arrangement of parts hereinafter fully described and claimed, reference being had to the accompanying drawings in which:—

Figure 1 is a side elevation, partly in section showing the elements of the device in retracted position, as when the apparatus is not in use.

Fig. 2 is a similar view showing the soldering iron in dipping position.

Fig. 3 is a vertical section through the parts illustrated in Figs. 1 and 2, and showing the soldering iron elevated to applying position.

Fig. 4 is a front elevation of the apparatus.

Fig. 5 is a top plan view thereof.

Fig. 6 is a sectional view through the iron supporting sleeve.

Fig. 7 is a detail view of the bracket supporting the cooling element detached from the frame.

Referring to the drawings, 1 designates a base, of slate or other suitable material, to which is suitably fastened a standard or upright 2 carrying at its upper end a four-armed coupling or connection 3. Secured to and extending forwardly from said connection is an arm 4, consisting of a rod or pipe having at its forward end a stop or abutment 5, and extending rearwardly from the said connection is a bracket arm 6, to which is universally jointed, as shown at 7, a holding ring or bracket 8. This ring or bracket 8 carries a flask or receptacle 9 containing a supply of acid or other fluxing agent 10 and having a neck portion 11 closed by a stopper 12. Through its stopper extends a tube 13, for the admission of air to take the place of the discharged acid, and through said stopper also extend one or more discharge tubes 14 and 15 having angularly bent discharge ends or nozzles 16, whereby the acid or fluxing liquid from the flask may be discharged in the form of drops or in a fine stream upon the work to be soldered. This acid applying device may be placed in position for operation by adjusting it upon its bracket support to bring the nozzles at a level for the feed of acid thereto by gravity, and then by tilting the flask back to an upright position the flow of acid may be cut off at any time desired, as will be readily understood. The discharge nozzles are of properly restricted diameter to supply just a sufficient amount of acid to the work within a given interval, so as to prevent undue loss or waste thereof.

Also connected with the coupling member 3 is a bracket arm 17 composed of a series of sections universally jointed for movements to various positions and carrying at its free end a cooling element 18. This cooling element may be and preferably does consist of a block of asbestos or other suitable absorbent, heat-proof material which will hold a sufficient store of water, and with which the article to be soldered may be brought in contact to quickly harden the solder preliminarily to a subsequent operation. In soldering, where subsequent operations are to be effected, much time is lost ordinarily on account of the necessity of the operator waiting until the solder cools before starting any other work or passing the article over to another workman. By the use of the adjustable cooling element 18, which may be arranged in position convenient to the workman, the article may be cooled by bringing it in contact therewith, so that the solder will rapidly harden without loss of time or any material amount of labor, and prepared for the immediate carrying forward of the subsequent treatment.

It will, of course, be understood that the cooling device 18 may be kept saturated with moisture in any preferred manner.

Mounted to revolve upon the arm 4 is a tube or sleeve 19 held from outward displacement by the abutment 5 and having depending from its forward end a horizontal transverse iron holder 20, carried by a rod 21 projecting at right angles from the arm. This holder 20 consists of a split sleeve, which is adjusted to receive and embrace the central portion of a bar or shank 22 carrying at one end a soldering iron 23 and at its opposite end an adjusting manipulating handle 24. The holder sleeve 20 is provided at one side with a longitudinal slot 25 through which the bar or shank 22 may be readily and conveniently inserted and removed, allowing soldering irons of different sizes or lengths to be interchangeably employed, said holder being preferably provided with a tubular bushing 26, of asbestos or like material, and which insulates it from the iron shank to prevent transmission of heat thereto from the iron. Carried by the holder is a clamping screw 27 adapted to impinge against the shank 22 to fasten the soldering iron in position. It will be observed from the foregoing description that the soldering iron as a whole is mounted so as to be turned or rocked upon and with the supporting sleeve as an axis to adjust the iron to lie at a desired angle or to move it into and out of contact with the work when such an operation becomes necessary, such movements of the iron also adapting it to be inserted into and withdrawn from the solder, as hereinafter described.

The solder is contained within a melting pot 28, and suitable operating mechanism is provided for swinging the iron in a vertical plane to dip it in the solder, as described, and raise it when desired for use. This operating mechanism comprises a lever arm 29 attached to the hollow shaft or sleeve 19 and coupled by a cord, chain or like flexible connection 30, passing over a guide pulley 31, with a foot piece 32. By depressing this foot piece the iron may be tilted upwardly to working position, and upon releasing the foot piece the iron will drop by gravity downward to submerge its tip in the molten solder.

The pot 28 is carried by a bracket arm 33 which has an upright spindle portion 34 journaled in a vertical sleeve 35 upon a post 2, which sleeve also supports the pulley 31, and between which spindle and sleeve is a gasket 36 of asbestos or other heat insulating material to prevent transmission of heat from the pot to the standard. Washers 37 are arranged upon the spindle in conjunction with a nut 38 and thus secure the spindle in position, while adapting said spindle to be turned or rotated to properly position the pot 28 with relation to the iron and heating means.

The means for heating the pot and iron comprises a gas supply pipe 39 supported by the standard 2 and having burner pipes 40 and 41 extending therefrom and carrying burners 42 and 43 respectively, valves 44 and 45 being provided in said pipes for controlling the supply of gas to the burners. The burner 42 is disposed beneath the pot 28 for directly heating the same, while the burner 43 terminates in an angular end which overhangs the pot and is arranged to project its flame against the soldering iron when the latter is in an elevated position, for the purpose of keeping the iron hot and the solder in a fluid condition and at the same time causing the surplus solder to be melted and to flow back into the pot. By the described arrangement it will be obvious that the pot 28 may be heated to the exact temperature desired to keep the solder in a proper state of fluidity.

From the foregoing description, taken in connection with the accompanying drawings, the construction and mode of operation of my improved soldering apparatus will be readily understood, and it will be seen that the invention provides an apparatus of this character which is especially desirable for use in soldering small articles, especially where a large number of articles are to be soldered at a time in regular order or succession, the construction enabling the operator to work with both hands free to manipulate and apply the articles to the acid supplier and soldering iron, so that each article may be easily and quickly soldered, allowing a large number of articles to be soldered in a given time. Furthermore, the construction is such that in many cases more than one workman may use one and the same apparatus, thus further increasing the production, while by providing the cooling element, considerable time and labor will be saved in handling articles which must be treated after being soldered, and where it is necessary to cool and harden the solder before carrying on further operations.

I claim:—

In a soldering apparatus, the combination of a supporting post, a soldering pot mounted upon the post, means for heating the same, an arm projecting from the post to a position above the soldering pot, a sleeve for the arm and adapted to rotate thereon, a support dependent from the sleeve, a soldering iron adjustably carried thereby, and means for imparting rotary motion to said sleeve.

In testimony whereof I affix my signature in presence of two witnesses.

JACOB SUTTER.

Witnesses:
 JOHN J. BAINED,
 JOHN A. PLYIN.

Copies of this patent may be obtained for five cents each, by addressing the "Commissioner of Patents, Washington, D. C."